United States Patent [19]
Willems

[11] Patent Number: 5,968,384
[45] Date of Patent: Oct. 19, 1999

[54] PROCESS AND DEVICE FOR AUTOMATICALLY WELDING PIPES

[75] Inventor: Lodewijk Willems, Wachtebeke, Belgium

[73] Assignee: Peter Willems, Zelzate, Belgium

[21] Appl. No.: 08/875,053

[22] PCT Filed: Dec. 20, 1995

[86] PCT No.: PCT/BE95/00117

§ 371 Date: Jun. 30, 1997

§ 102(e) Date: Jun. 30, 1997

[87] PCT Pub. No.: WO96/22856

PCT Pub. Date: Aug. 1, 1996

[30] Foreign Application Priority Data

Dec. 29, 1994 [BE] Belgium .................................. 9401186

[51] Int. Cl.$^6$ .................................................. B23K 9/00
[52] U.S. Cl. ........................... 219/125.1; 219/61; 901/42
[58] Field of Search .................... 219/125.4, 125.1, 219/158, 159, 161, 61; 269/46; 901/42

[56] References Cited

U.S. PATENT DOCUMENTS

| | | | |
|---|---|---|---|
| 3,571,908 | 3/1971 | Pilia | 219/61 |
| 4,058,025 | 11/1977 | Wood . | |
| 4,145,593 | 3/1979 | Merrick et al. . | |
| 4,346,808 | 8/1982 | Garlung et al. . | |
| 4,347,421 | 8/1982 | Mukuda et al. . | |
| 4,535,213 | 8/1985 | Ljubomir | 219/161 |
| 5,165,160 | 11/1992 | Poncelet . | |
| 5,312,096 | 5/1994 | Jasper . | |
| 5,512,726 | 4/1996 | Arantes et al. | 219/125.1 |

FOREIGN PATENT DOCUMENTS

| | | |
|---|---|---|
| 543437 | 5/1993 | European Pat. Off. . |
| 1284431 | 8/1972 | United Kingdom . |

OTHER PUBLICATIONS

Patent Abstracts of Japan, vol. 018, No. 217 (M–1594), Apr. 19, 1994, & JP A 06 015487 (Komatsu Ltd) Jan. 25, 1994.

*Primary Examiner*—Clifford C. Shaw
*Attorney, Agent, or Firm*—Sughrue, Mion, Zinn, Macpeak & Seas, PLLC

[57] ABSTRACT

A process for automatically welding parts consisting of a number of tubular members (2, 3, 4 and/or 5) cut out and welded together to form a pipe (1). A previously welded part is positioned and secured using a securing jaw. The part is suspended every time from its center of gravity (G) using the securing jaw (50) and a cable (52) stretched between the two securing points, as well as a suspension joint (37), so that the part lifted by means of a lifting apparatus can be moved along about its center of gravity (G). The previously welded part and as standardized spare part are then welded using a welding robot (30) along the contact line between the two tubular parts.

11 Claims, 6 Drawing Sheets

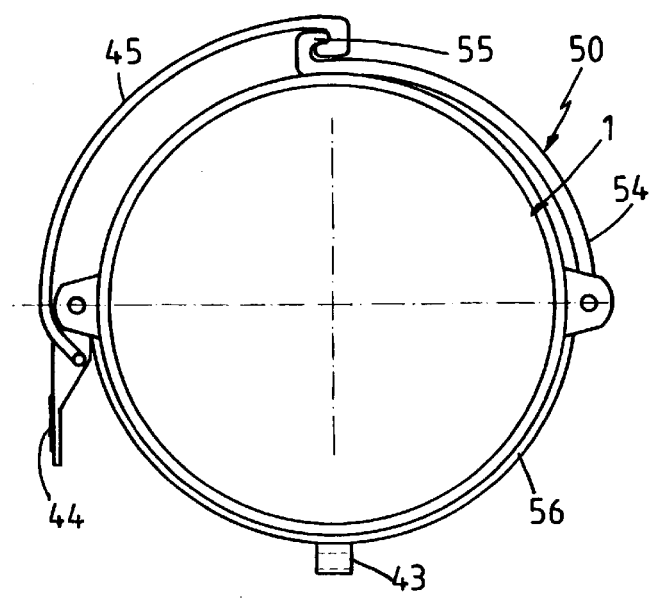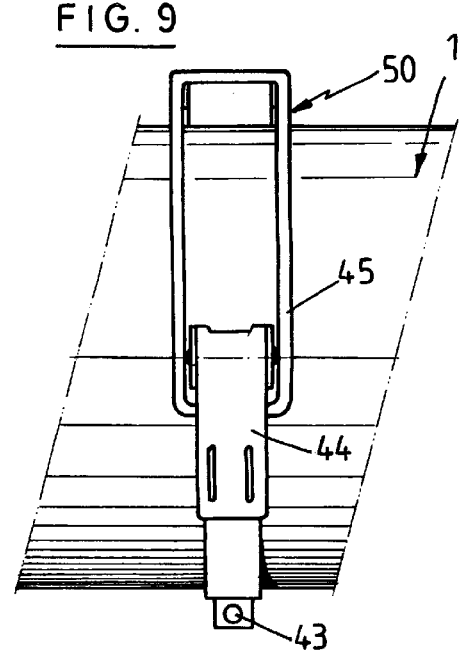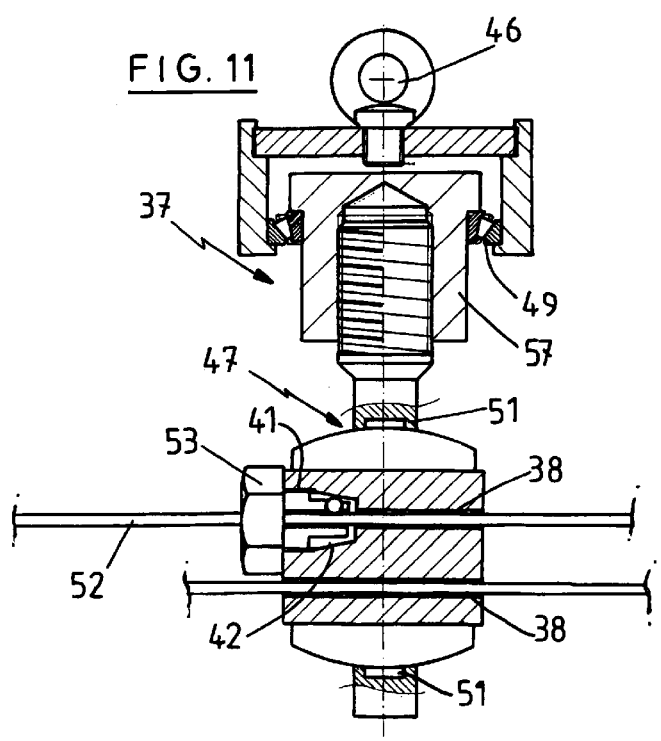

PROCESS AND DEVICE FOR AUTOMATICALLY WELDING PIPES

BACKGROUND OF THE INVENTION

The present invention relates to a process and a device for automatically welding workpieces consisting of a certain number of tubular components which are cut and joined together by welding in order to form piping, in which process the component already joined by welding and the standardized separate component are welded, after positioning and securing by securing jaws, by means of a welding robot along the line of contact between the two workpieces to be joined.

It finds its main application in assemblies in the chemical and petrochemical industries, metal construction workshops and assembly workshops.

Automation of the welding process is currently possible in very many branches of industry, in particular in metal construction and the automobile industry. Automatic welding processes are also applied in chemical factories but their applications are limited to the production of relatively simple components which can still be manipulated manually.

There are three methods for automatically making a weld by means of a welding robot:

1) the workpiece is secured and the torch moves along the weld seam, during which the automaton performs a precise movement. Bodywork accessories are produced in this way in the automobile industry;
2) the torch occupies a fixed position and the workpiece is able to perform the necessary movement, for example a revolution about a horizontal axis at a suitable speed;
3) a combination of the above two methods. As a result of recent developments in electronics, open control systems which are easy to employ have now been commercialized, by means of which it is possible to synchronize the movements of the workpiece and the torch.

When welding piping, one is confronted with the problem of complicated programming for the movement of the torch, because the weld seam lies every time at various inaccessible points. A program has to be written for each seam.

On the other hand, the welding machine in which the torch occupies a fixed place and the workpiece is moved has the drawback that, if the piping is of unusual shape and dimensions, the workpiece is complicated to manipulate. The movement of the piping is different for each weld seam and consequently impossible to program.

The problem consists in proposing accessories for a suspension and/or welding machine, as well as in developing a welding method by means of which certain workpieces of complicated shape and dimensions can be produced automatically without any manual intervention using standardized elementary tubular components. The workpiece thus obtained may be manipulated and moved at any time without the acceptable limit values, imposed by the directives for the manual handling of loads and the manipulation of merchandise, being transgressed, in accordance with the Royal Decree of Aug. 12, 1993 relating to the manual handling of loads. This Royal Decree transposes into Belgian Law the fourth Special Directive, 90/269/EEC, of the Council of the European Communities of May 29, 1990 relating to the minimum health and safety regulations relating to the manual handling of loads involving risks, especially dorso-lumbar risks, for workers.

SUMMARY OF THE INVENTION

The object of the present invention is to make the manual handling of piping easier. It provides a process wherein that part of the component to be welded which has already been joined by welding is always suspended from its centre of gravity by means of securing jaws and a cable which is held taut between the two securing points, as well as a suspension joint which consists of a cable tensioner, which is jammed in a ball joint which is in turn suspended in a swivel. The swivel is preferably mounted in a ball bearing. Thus, the force which, according to the lever rule, is required to rotate the workpiece about any axis which passes through the centre of gravity, and to overcome the friction in the ball joints and the swivel, is negligible. The workpiece which is lifted using a lifting apparatus is in equilibrium about the centre of gravity and can be manipulated effortlessly.

According to one feature of the invention, an interchangeable gripping arm, removably fixed to an articulated arm of a welding robot, takes a standardized separate workpiece from a store to a work station.

The proposed process uses a device which results from the combination of two accessories. The first accessory is a pair of jaws carried by a semicircular frame provided with a cable attachment which serves as a gripping point for the cable intended to lift the workpiece, and also as a cover in the form of a quadrant of a circle able to pivot about hinges having a rim in the form of a pouring spout and as a tension accessory provided with a fold-down lever.

A second accessory is a hanging joint consisting of a metal body which is suspended, via a swivel provided with a ball bearing, from an eye, for the purpose of which the body has two equidistantly spaced holes, at least one of which is provided with an internal thread and a clamping bolt having a housing in order to keep a hauling cable taut. Such a hanging joint enables the workpiece to be oriented in any direction.

These characteristics and other features of the invention will appear in the course of the following description, with reference to the drawings appended hereto, which show an embodiment of the invention by way of non-limiting illustration.

BRIEF DESCRIPTION OF THE DRAWINGS

In these drawings:

FIG. 9 is a partial view of a securing clamp according to the invention;

FIG. 10 is an end view of the clamping jaws shown in FIG. 9;

FIG. 11 is a cross-section of a hanging joint;

In these figures, the same reference symbols indicate identical or similar elements.

DESCRIPTION OF PREFERRED EMBODIMENTS

Figure 1:
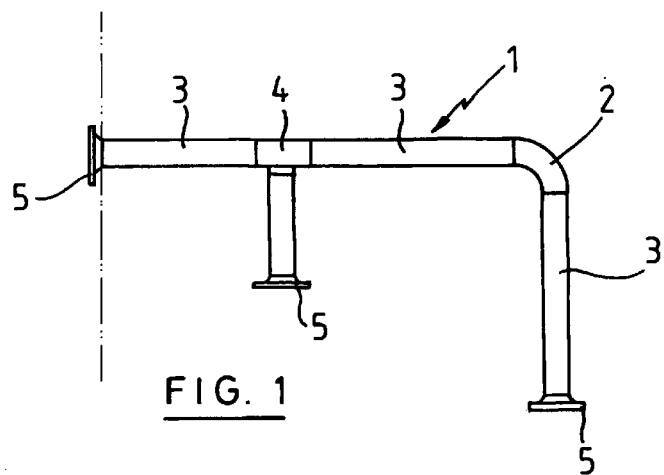
FIG. 1 is a diagram of piping of complicated shape and dimensions, consisting of nine standardized tubular components.
Figure 2:
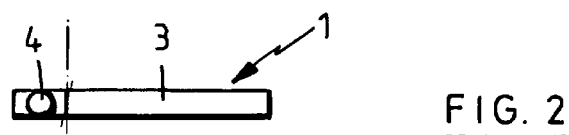
FIGS. 2 to 8 are in each case an example of the planning of a piece of work, showing a succession of operations for producing the abovementioned piping.
Figure 3:
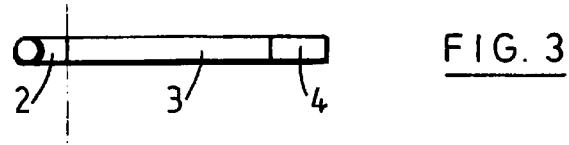
Figure 4:
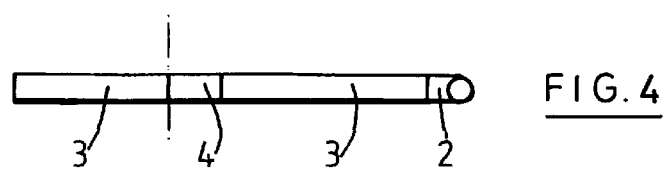
Figure 5:
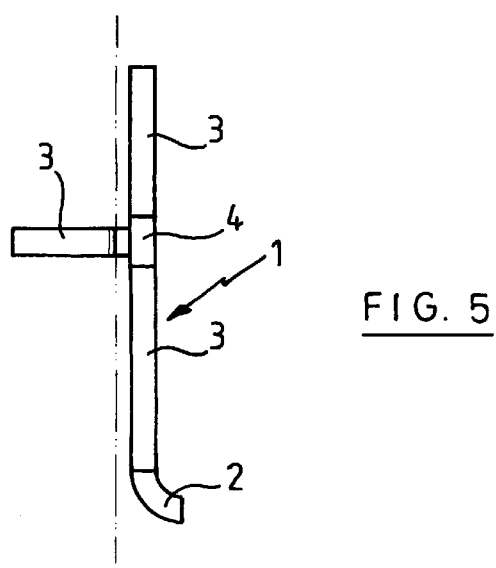
Figure 6:
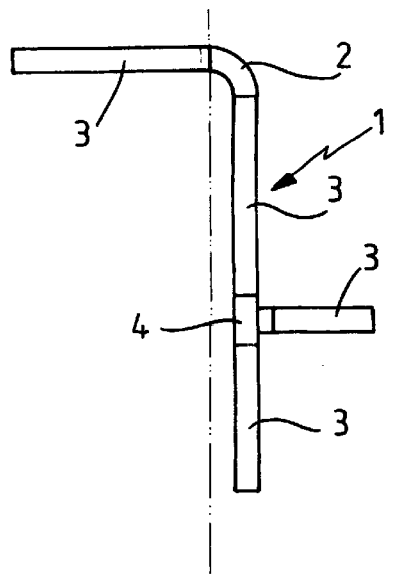
Figure 7:
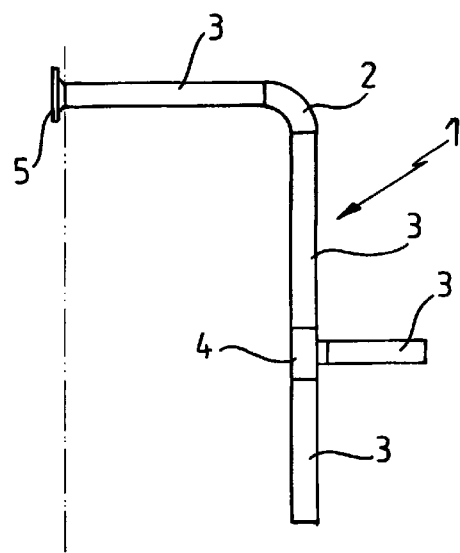
Figure 8:
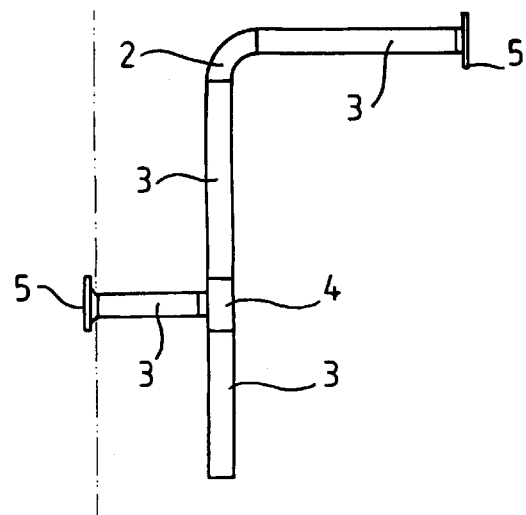

As illustrated in FIG. 1, piping is formed from several standardized pipes which are welded to each other, for example tubular components 3, elbows 2, tees 4 and flanges 5. The complicated piping is produced by a succession of steps, as illustrated in FIGS. 2 to 8.

The welding unit comprises three parts:
1. a supply system and a securing device;
2. a hanging system and a lifting device;
3. a welding device comprising a moveable welding torch 34 controlled by a robot 30.

The device according to the invention includes a welding robot, having an articulated arm to which can be removably and successively attached an interchangeable gripping arm, which removes the component or components to be welded from a store of standardized separate components, this store being within the robot's reach, and takes them to the welding station in the desired disposition, a cutting torch, which traces out on the components to be welded the lines of intersection and of penetration of the components to be welded and cuts the corresponding profiles, and an interchangeable welding torch which produces the weld seam which joins the abovementioned components together.

The welding of the components to each other is carried out as follows.

A free standardized tubular component is taken by a gripping arm attached to an articulated arm of a welding robot 30 to the work station of a welding torch 34.

The securing of the portions of straight pipes 3, tees 4 and flanges 5 is achieved using a straight spindle 26 provided with hydraulically operated securing keys which are distributed radially around the spindle 26.

Figure 12:
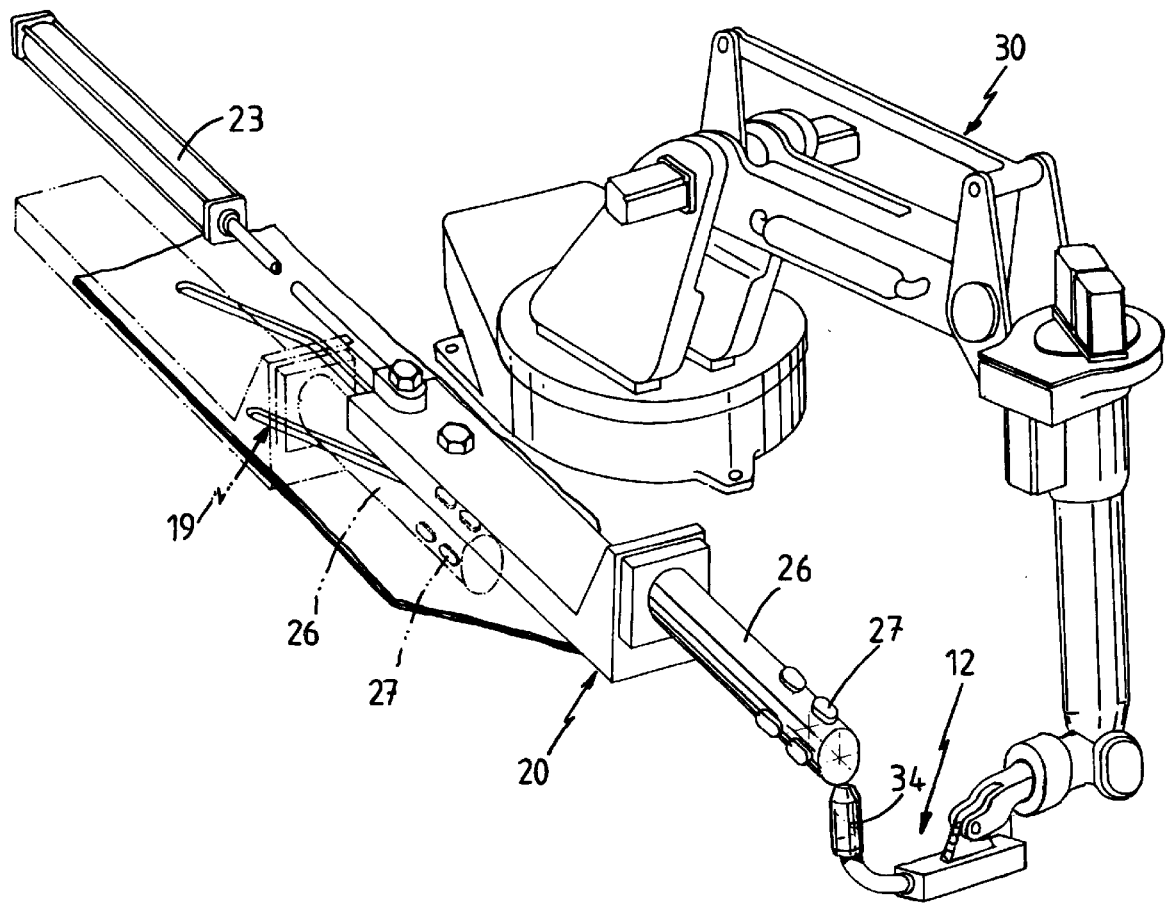
FIG. 12 is a perspective view of a mandrel for positioning a straight tubular workpiece.

The spindle is illustrated by a cylinder which is moved from a rest position 19, shown by the dotted lines in FIG. 12, to a service position 20. The spindle moves by sliding along a curved slideway shown by the solid lines in the same FIG. 12.

Figure 13:
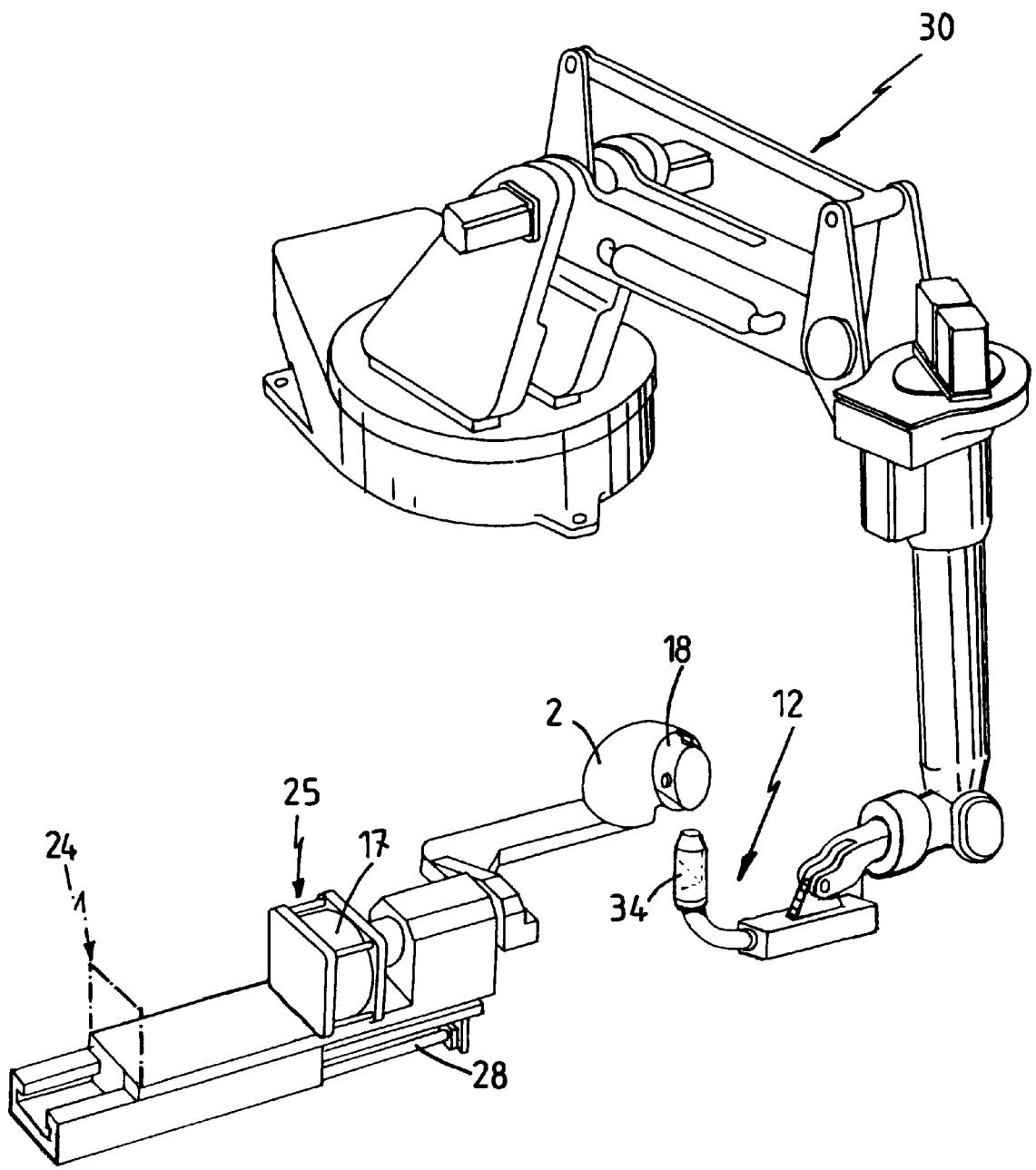
FIG. 13 is a perspective view of a curved mandrel for positioning an elbow in the welding robot.

The elbows 2 are secured to a curved spindle 18, placed so as to be parallel to the welding plane. This spindle is brought by sliding or pivoting from a rest position 24, illustrated by the dotted lines in FIG. 13, to a service position 25, illustrated by the solid lines in the same figure, by means of the combination of linear movements of a double-acting cylinder 28 and of a pivoting movement of a rotary cylinder 17.

The components to be welded are secured to the curved spindle under the action of the hydraulically operated securing keys.

Figure 14:
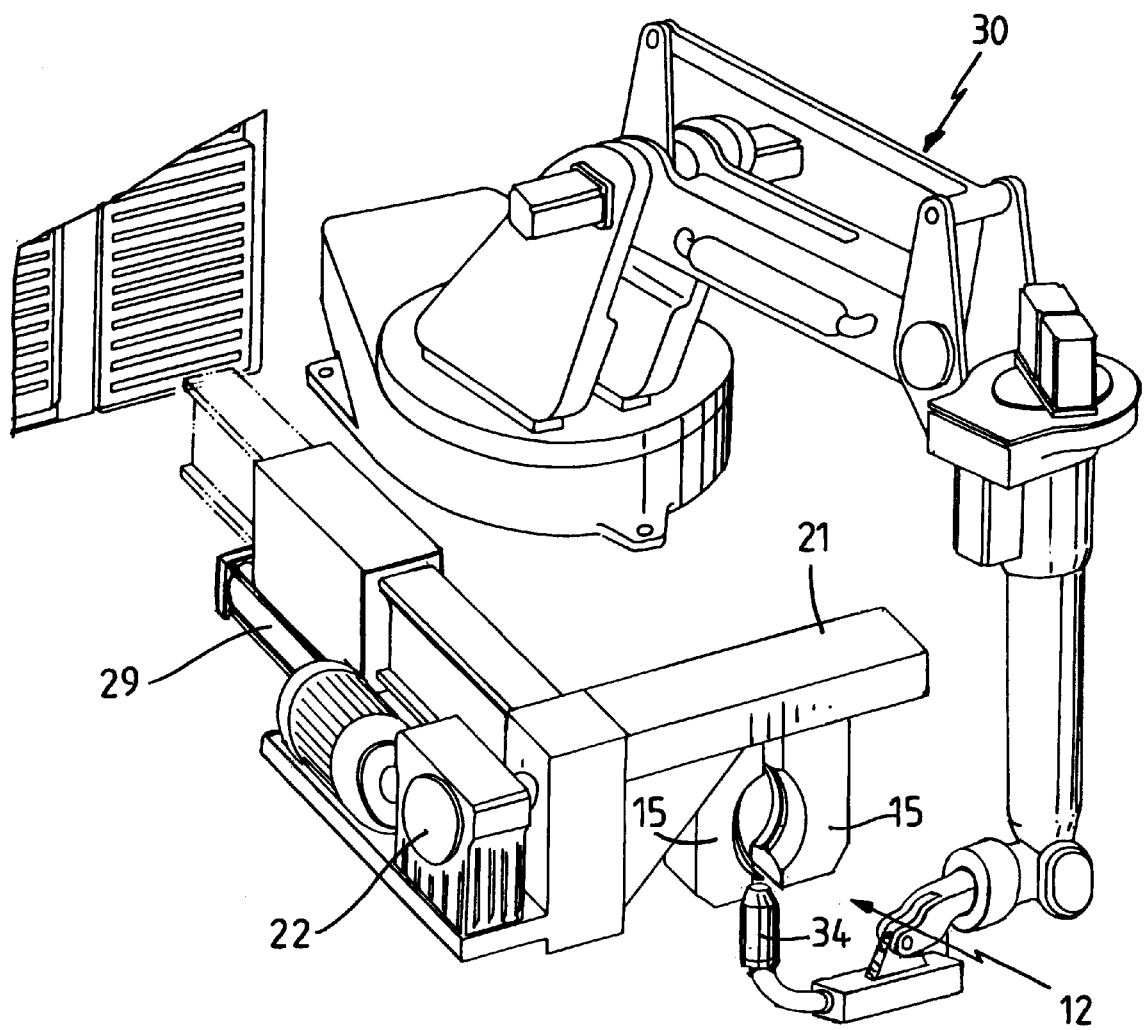
FIG. 14 is a perspective view of a swivelling securing device.

As illustrated in FIG. 14, the swivelling securing device 21 comprises two jaws 15 which are connected by a threaded rod, comprising a right-hand thread and a left-hand thread, which grips or releases a component to be welded. The threaded rod is driven by a gear motor 22. Movement perpendicular to the welding surface is performed by means of a hydraulic cylinder 29.

Finally, the securing device 21 resumes its initial position in which the space is freed to allow the components to be joined by welding.

The room taken up by the gripping members in the steric configuration surrounding the work station of the welding torch is limited to only one quadrant of the available space. It follows that the weld seam is always accessible and that the welding operation can always be carried out easily by making the torch 34, carried by an articulated arm of the robot 30, perform a circular movement, which is easy to program.

That part of the piping 1 already welded is attached to the centre of gravity G by means of a lifting device (overhead crane).

After having secured the two workpieces the welding is carried out, during which the torch 34, mounted on the welding robot 30, performs a circular movement, programmed beforehand by computer, along a line of contact between the standardized separate components and that portion of the piping already produced.

The welding device consists of a robot currently available on the market, comprising a six-axis articulated arm on which the welding torch 34 is mounted. The robot 30 is coupled to a welding station. The robot can start welding after the workpieces have been secured and the swivelling jaws 21 have been retracted. The operator chooses between various operations programmed beforehand. It is sensible to indicate and number the sequence of operations on the working drawings so that the operator only has to input the codes on the screen.

The components already joined together by welding are gripped at the centre of gravity so that the workpiece can be easily rotated in any direction and brought easily to the securing device.

The piping may be suspended from its centre of gravity G in the following manner.

Two pairs of jaws, half open, are moved by sliding along the piping. Next, the jaws are tightened and tensioned using the lever 44. The jaws form the anchoring points for a cable 52 which is clamped by a clamping screw 53 in a tensioner described in more detail below. The position of the securing device is determined so as to be aligned with respect to the centre of gravity G. The cable 52, attached to the strong point for attaching the cable, passes through the centre of gravity of the piping.

The precise place to which the securing jaws have to be brought may be indicated on the design office working drawings. Given that standardized separate components are used, inter alia straight pipe portions, elbows 2, tees 4 and flanges 5, the centre of gravity of which is known, the centre of gravity of the piping portion already joined by welding may be rapidly determined, simply by connecting the centres of gravity of the separate components of which the whole assembly is composed by straight-line segments and by applying the lever rule.

The cable 52 is then tightened and the point of hanging on the cable, comprising a suspension joint, is moved by sliding along the cable towards the centre of gravity. The centre of gravity lies on the straight line connecting the two pairs of securing jaws. The centre of gravity lies on the straight line connecting, on the one hand, the centre of gravity of that portion of the piping already joined by welding and, on the other hand, the centre of gravity of the component last welded, whereby the ratio of the distances of the centre of gravity of the already welded assembly and of the centre of gravity of the component last welded from G is inversely proportional to the ratio of the weights of the corresponding parts.

The fact that it is possible to rotate the piping in any direction, after having secured it using the clamping screw 53 and after lifting the assembly by means of the eye 46 is due to the ball bearing hinge 51 (FIG. 11). The moment of force, which the operation must provide in order for the component to be handled manually, is equal to the product of the weight of the assembly and the distance between the hanging point and the centre of gravity G. The closer the hanging joint 37 is to the centre of gravity, the smaller will be the force that the operator will have to exert in order to place the piping in the desired position (NV X 35-109, Apr. 1989 or the Royal Decree of Dec. 8, 1993).

It is also possible to use two cables, each being fixed to a tubular component.

This procedure provides the following advantages:

a) the weld seam is more rapidly produced;
b) the appearance and quality of the weld are superior;
c) the quality of the weld is constant;
d) the pipe portions are positioned more rapidly;
e) the availability can be adjusted.

I claim:

1. A process for automatically welding workpieces consisting of a set of tubular components to be cut and welded together in order to form a piping, said process comprising the steps of:

welding together at least one first and another of said components after positioning and securing them, said welding being produced, along a line of contact between the two components to be welded, by means of a welding robot having a welding torch;

suspending said first component substantially in a centre of gravity thereof so as to bring said first component into a position at which a spindle is introduced into said first and said another components in order to immobilize said first and another components at said line of contact; and then moving said welding torch along said line of contact.

2. The process according to claim 1, further comprising the step of taking said another component from a store to a work station by means of an interchangeable gripping arm removably attached to an articulated arm of the welding robot.

3. The process according to claim 1, further comprising the step of applying at least two securing jaws on said first component, said suspending step being accomplished by holding taut a cable between securing points on said securing jaws.

4. A device for automatically welding a set of tubular components to a piping, said device comprising:

a hinged arm to which a cutting and a welding torch are removably mounted, said cutting torch having the function of tracing intersection and penetration lines on at least two of said components to be welded together, and of cutting said components along said lines, said welding torch having the function of applying a weld in order to weld said two components to each other;

a spindle;

a removably mounted gripping arm for retrieving components from a store and for supplying them to said spindle, said spindle having securing means for immobilizing, during cutting and welding, the components supplied to said spindle; and means for moving said cutting and welding torch as around said spindle.

5. The device as claimed in claim 4, wherein said securing means are mounted radially around said spindle, for applying pressure on an inner wall of said components supplied to said spindle.

6. The device according to claim 4, wherein said device further comprises a cable and securing jaws provided with securing points, said cable being held taut between two of said securing points.

7. The device according to claim 6, wherein said securing jaws clamp or release the components to be welded in a direction which is perpendicular to a welding surface.

8. The device according to claim 6, wherein said spindle is provided on its periphery with hydraulically operated securing keys which are movable along a slideway.

9. A device according to claim 4, wherein the spindle is straight.

10. A device according to claim 4, wherein the spindle is curved.

11. A device for automatically welding a set of tubular components to a piping, said device comprising:

a hinged arm to which a cutting and a welding torch are removably mounted, said cutting torch having the function of tracing intersection and penetration lines on at least two of said components to be welded together, and of cutting said components along said lines, said welding torch having the function of applying a weld in order to weld said two components to each other;

a spindle;

a removably mounted gripping arm for retrieving components from a store and for supplying them to said spindle, wherein said cutting and welding torches, said gripping arm and said spindle are arranged in an area covering at the most a quarter of a circle with respect to said two components to be welded.

* * * * *